United States Patent

[11] 3,602,819

[72] Inventors  Richard W. Abbott
                Kernersville;
                Samuel S. Montgomery, Greensboro, both of, N.C.
[21] Appl. No. 822,414
[22] Filed     May 7, 1969
[45] Patented  Aug. 31, 1971
[73] Assignee  Western Electric Company, Incorporated
               New York, N.Y.

[54] SENSITIVITY OR NOISE LEVEL MEASUREMENT CIRCUIT AND METHOD
1 Claim, 2 Drawing Figs.

[52] U.S. Cl. .................................................. 325/363,
                                                              324/140
[51] Int. Cl. ................................................... H04b 1/00
[50] Field of Search .......................................... 325/363,
                                                       133; 324/57, 140

[56]                    References Cited
                    UNITED STATES PATENTS
2,691,098  10/1954  Selove ......................... 325/363

2,959,672  11/1960  La Haise ....................... 325/363

Primary Examiner—Robert L. Griffin
Assistant Examiner—R. S. Bell
Attorneys—H. J. Winegar, R. P. Miller and S. Gundersen ABSTRACT: A device, such as a receiver, amplifier, active filter, etc. is tested for sensitivity or noise level by modulating an input signal source and switching the output of the device between two terminals in synchronism. Following signal detection and integration, the output of one of the terminals is connected to one side of a null detector while the output of the other terminal is connected through a resistance network and then to the other side of a null detector. The resistor network is adjusted so that when the input signal source is reduced to a level such that the output signal of the device is equal to the noise level within the device, the null detector indicates a null. The input signal level in dbm at this point is equal to the sensitivity of the device.

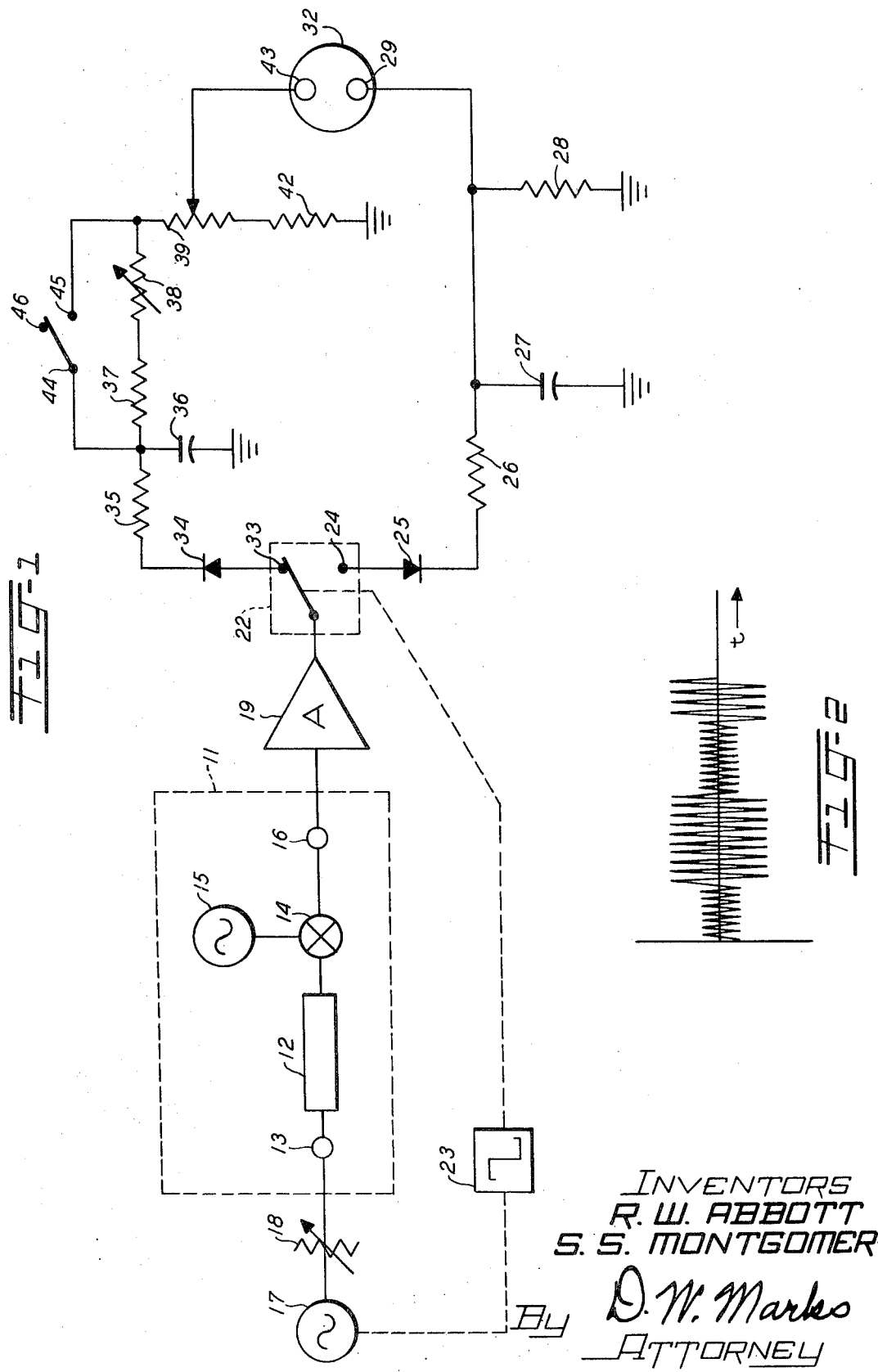

SENSITIVITY OR NOISE LEVEL MEASUREMENT CIRCUIT AND METHOD

GOVERNMENT CONTRACT

The invention herein claimed was made in the course of, or under contract with the United States Army.

BACKGROUND OF THE INVENTION

1. Field of the Invention

The invention is directed to a circuit and method for quickly measuring the sensitivity or noise level of a radiofrequency device, such as a receiver, amplifier, active filter, active network, etc. The sensitivity of a receiver, for example, is a measurement of the ability of the receiver to receive weak radio signals. The figure of merit used to represent the characteristic of sensitivity, and often referred to as tangential sensitivity, is the receiver input signal level at which the output signal level of the receiver is equal to the output noise level of the receiver. This is the input signal level at which the output of the receiver with an input signal is twice the output of the receiver without an input signal; that is, the point at which the output signal-to-noise ratio is equal to one.

2. Description of the Prior Art

One of the principal ways in which the sensitivity of a device, such as a receiver, has been measured in the past is that of connecting a calibrated voltage source to the input of the receiver and displaying the receiver output signal waveform on an oscilloscope. The input source is alternately switched on and off as the input signal level is experimentally varied until the output waveform visually appears to be twice as large with the input source as without the input source. The sensitivity is read from the calibrated voltage source in dbm. as the input signal level at that point. However, for production testing of receivers, this technique is both slow and inaccurate since the steps are performed manually and the measurement depends upon the precision of the judgement of the operator conducting the test.

SUMMARY OF THE INVENTION

In one embodiment of the invention, a method and circuit are contemplated wherein a signal having a variable power level is introduced into the input of a radio device and interrupted at a preestablished rate. The output from the device is sampled at the preestablished rate and the output level with an input present is compared to the output level with an input absent. An indication is produced when the output level with an input is twice the output level without an input. The input power level at which the indication is produced is equal to the sensitivity or noise level of the device.

BRIEF DESCRIPTION OF THE DRAWING

The nature of the present invention and its various advantages will appear more fully by referring to the following detailed description in conjunction with the appended drawing, in which:

FIG. 1 is a schematic drawing of a circuit for measuring sensitivity constructed in accordance with the invention; and FIG. 2 is an illustration of waveforms which are produced at the output of a receiver under test.

DETAILED DESCRIPTION

Referring to FIG. 1, there is shown a device, such as a radiofrequency receiver 11, which is to be measured for sensitivity. The receiver 11 may include, for example, components normally found in a heterodyne circuit; namely, a selective band-pass filter 12 having its input connected to an input terminal 13 of the receiver and its output connected to the input of an R.F. mixer 14. A local oscillator 15 supplies a signal of fixed frequency to the mixer 14 and an intermediate frequency signal is coupled from the output of the mixer to a receiver output terminal 16.

The test circuit includes a signal source 17 which produces a radio test signal in the frequency range at which the receiver 11 will be operated. The source 17 may be a commercial signal generator which may be amplitude modulated by a signal applied to an external modulation input thereto. The source 17 is provided with facilities for measuring its peak output power in dbm. The test signal is delivered to the input terminal 13 of the receiver under test 11 through a calibrated, variable attenuator 18. The output terminal 16 of the receiver 11 is connected to the input of an intermediate frequency amplifier 19 having its output connected to the input of a single-pole double-throw high speed, diode switch 22. The switch 22 is preferably of a type similar to the type DS13 Switch and Driver manufactured by Sanders Associates, Inc., Nashua, New Hampshire, and operates by alternately connecting the signal impressed upon its single input terminal to one of a pair of output terminals 24 and 33. The switching functions of switch 22 are performed electronically without moving parts and is only shown as a mechanical switch in the drawing for purposes of illustration. The switch 22 is actuated by a square wave voltage from a modulation signal source 23 which is impressed upon a control lead of the switch.

The modulations signal from the source 23 is also applied to the external modulation input of the signal source 17. The magnitude of the modulation signal from source 23 is sufficiently large to produce a 100 percent modulated test signal from the source 17. Thus, the test signal has maximum magnitude for one-half cycle of the modulation signal and zero magnitude for the other half-cycle. FIG. 2 illustrates the form of the output voltage from the I.F. amplifier 19 as input source 23 is modulated. The smaller voltage levels are representative of noise in the receiver alone while the large voltages are signal plus noise. The input signal level when the ratio of the levels is 2:1 is the tangential sensitivity or noise level of the receiver. TIn synchronism with each of the modulation cycles of the signal source 17, the modulation source 23 simultaneously switches the signal on the input terminal of the diode switch 22 between two respective output terminals 24 and 33. The modulating signal source 23 operates at a preestablished frequency, preferably for example, in the range of 7 kHz.

The first output terminal 24 of the diode switch 22 is connected through a first diode detector 25 to a first sampling path including a first integrating network comprising a resistor 26 and a capacitor 27. The output of the integrating network is connected across a high resistance output resistor 28 and to a first input terminal 29 of a null detector 32.

The second output terminal 33 of the diode switch 22 is likewise connected to a second sampling path also including a detecting diode 34 and a second integrating network including a resistor 35 and a capacitor 36. The integrating network is connected to a resistive network including a fixed resistor 37 connected in series with a variable resistor 38 and then to a series connected output resistor including a variable resistor 39 connected in series with a fixed resistor 42. The tap of the resistor 39 is connected to a second input terminal 43 of the null detector 32. Both of the resistors 26 and 35 and the capacitors 27 and 36 comprising the respective first and second integrating networks are of the same value. A calibration switch 44 is arranged to shunt out the series resistors 37 and 38 when in a calibrate position and connected to a calibrate terminal 45. The switch 44 is out of the circuit when connected to the operate terminal 46.

In operation, the modulation signal source 23 modulates the output of the test signal source 17 so that when the diode switch 22 is connected to the first output terminal 24, no input signal is connected from the source 17 to the input terminal 13 of the receiver 11. When the diode switch 22 is connected to the second output terminal 33 of the diode switch 22, a voltage signal from the source 17 is connected to the input 13 of the receiver 11.

Initially, the value of the variable attenuator 18 is increased to maximum so that essentially no signal is delivered from the source 17 to the input of the receiver. With only noise from the receiver 11 going into the I.F. amplifier 19, the calibration switch 44 is placed in the calibrate position to shunt out the series connected resistors 37 and 38, and the variable output resistor 39 is adjusted so that a null is detected on the meter 32. Next, a calibration oscilloscope (not shown) is connected to the output of the intermediate frequency amplifier 19 and the value of the variable attenuator 18 is decreased to allow a signal from the source 17 to reach the input of the receiver 11 and to adjust the input signal level to the receiver 11 so that the ratio of I.F. voltage with input signal to I.F. voltage without input signal is 2:1 156 as shown on the oscilloscope waveform. This technique is similar to that described above under prior art. With this setting of input signal level to the input terminal 13 of the receiver 11, the calibration switch 44 is placed in the operate position and the variable resistor 38 is adjusted so that the null detector 32 again shows a null. The circuit is now calibrated.

Once the test circuit is calibrated, a receiver to be measured is placed in the circuit and the attenuator 18 is increased in attenuation value until a null is shown on the detector 32. If the output power level of the signal source 19 has been preset to 0 dbm., The sensitivity value of the receiver may be read as the value of the attenuator setting in —dbm. when the detector is at a null condition. If the output power level of the signal source 19 is greater than 0 dbm., the sensitivity of the receiver under test is determined by adding the power level and attenuation values to ascertain the exact power level into the input of the receiver.

What is claimed is:

1. A circuit for measuring the sensitivity of a radio device, comprising:

means for applying a signal to the input of said device;

means for varying and for indicating the power level of the signal applied to the input of said device;

switching means connected to the output of said device for alternately connecting the output signal from said device to a first and a second sampling path;

means for interrupting said input signal and for actuating said switching means in synchronism to connect the output of the device to said first sampling path when the input signal is absent and to said second sampling path when the input signal is present;

means for detecting and integrating the signals impressed upon the respective first and second sampling paths;

first and second variable resistances connected in series in said second sampling path;

means having a first input connected to the first sampling path and a second input connected to the second variable resistance for indicating the relative magnitude of signals applied to the first and second inputs thereof;

means for shorting said first variable resistance during a calibration step;

said second variable resistance being adjusted so that there are equal signal magnitudes applied to the first and second inputs of said indicating means when said shorting means is operated and no signals are applied to the input of the device; and said first variable resistance being adjusted so that equal signals are applied to the first and second inputs of said indicating means when the magnitude of the signal on the second sapling path is twice the magnitude of the signal on the first sampling path.